Patented Dec. 10, 1935

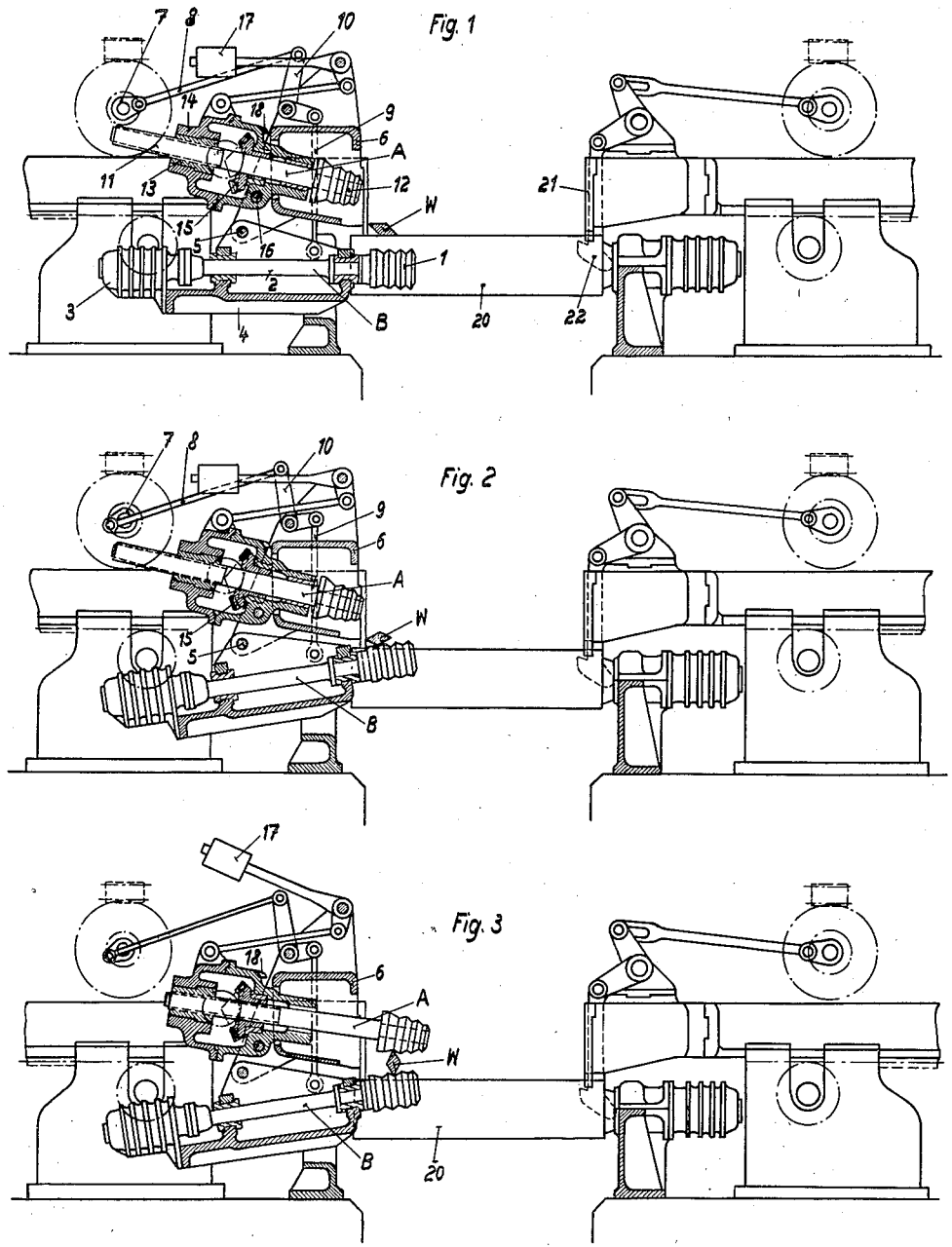

2,023,880

UNITED STATES PATENT OFFICE 2,023,880

MANIPULATOR FOR ROLLED STOCK

Josef Gassen, Dusseldorf-Oberkassel, Germany, assignor to Schloemann Aktiengesellschaft, Dusseldorf, Germany, a corporation of Germany Application May 1, 1934, Serial No. 723,323
In Great Britain May 27, 1933

5 Claims. (Cl. 80—49)

My invention relates to a manipulator for rolled stock.

In rolling mills, means are associated with the conveyers to which the rolled material is delivered from the mill stands for turning the same, in order to place the material in the proper angular position for the next passage through the mill. Further means are provided for transferring the material across the conveyer to align it with the passes arranged side by side in the rolls and for straightening it at the same time if necessary.

The present invention has for its object a manipulator for rolled stock in which the means for turning, transferring and straightening the material are combined in one carrier, so as to form a self-contained structure.

According to the invention the turning means which preferably comprise two coacting rams are mounted in a carrier which is movable across the conveyer and has a straightening face plate which cooperates with a similar face plate on a second movable carrier arranged at the other side of the conveyer, the rams are so arranged in the carrier that they are out of the way when not used, but may be advanced to grip the material and turn it through any desired angle.

This may be accomplished by arranging one ram so that it is normally below the surface of the conveyer, but may be swung upwards in its operative position, whereas the other ram is situated normally laterally with respect to the conveyer, but may be axially advanced to its operative position.

Other features of my invention will appear from the following description of one preferred embodiment with reference to the appended drawing in which: Fig. 1 is a view of a roller conveyer with the manipulator embodying the invention attached thereto the turning means being at rest, Figs. 2 and 3 are similar views showing the turning means in an intermediate and an end position respectively.

In the drawing, a lower ram B is shown, having a grooved head I and a shaft 2 driven by a motor 3. These parts are mounted in a support 4 which is pivoted about a pin 5. The latter is seated in a lug of a bar or ledge 6 which has at its inner side a face plate for straightening material on the conveyer as will be later described.

The head I is normally below the surface of the conveyer 20 so that it is not in the way of the material on the conveyer but the head may be raised above that surface. To this end, the support 4 can be tilted about pivot pin 5 by a crank 7, links 8 and 9 and bell-crank lever 10, or any other suitable means.

The upper ram A has a screw threaded shaft 11 and a grooved head 12 which is slightly tapered forwards and turns loosely on said shaft. A nut 13 engages the threaded part of the shaft and is fixed to a casing 14 which supports the shaft. A bevel gear 15 is mounted on shaft 11 which axially displaces and rotates the latter. Bevel gear 15 is driven by any suitable means not shown here. Head 12 is normally in its retracted position (Fig. 1) so that like head I it does not extend into the space above the conveyer.

Casing 14 is pivoted about pin 16 on ledge 6 and has a counterweight 17 attached to it so as to hold head 12 constantly down in its lowermost position. Downward movement of head 12 is limited by a stop 18 on casing 14 which abuts against the back wall of ledge 6.

In the drawing, I have further shown a bar W of diamond-shaped cross section which is supported on the conveyer 20, (Fig. 1), after its passage through a rolling mill which, being of any well-known, design, need not be described here. Suffice it to say that its rolls have a plurality of passes arranged side by side and that the rolled stock, apart from having to be transferred across the conveyer to be in alignment with the individual passes must be turned through an angle of 90°.

This turning operation is started by the raising of the lower ram B by means of crank 7 so as to lift bar W from the conveyer 20 (Fig. 2). The upper ram A is then moved outwards by means of the bevel-gear 15 until the grooved head 12 engages bar W, so that the latter becomes firmly gripped between the two ram heads I and 12. The outward movement of ram A, however, is still continued in the course of which bar W is turned through 90° as between two rasps (Fig. 3).

Head I is rotated by motor 3 so that there is no slip between head I and the bar W which is delivered from and to the mill during all this time, whereas head 12 is rotated on its shaft 11 by the lengthwise movement of bar W itself so that there is no slip either between bar W and head 12.

Upper ram A is tilted upwards without, however, becoming disengaged from bar W, because the counterweight 17 exerts a continuous downward pressure on head 12. When the bar W has left the rams A B on its subsequent passage through the rolling mill, ram A returns to its normal position in which stop 18 abuts against ledge 6. Ram B is returned to its normal position by crank 7.

The whole structure comprising the ledge 6 with its two pivoted supports 4 and 14 constitutes a single carrier which can be moved across the conveyer by any suitable means, such as a rack and pinion drive for instance. Thus, the two rams A and B can be advanced to any desired position for gripping and turning a bar, and they can further transfer it when gripped to align it with any pass between the rolls.

A carrier having a face plate 21 similar to that of ledge 6 is arranged at the opposite side of the conveyer and also movable across it. The bars can be thus clamped between the two face plates and be straightened if necessary.

A hook-shaped member 22 is arranged on the carrier having the face plate 21 for turning bars of rectangular or square cross-section as is well-known in the art.

In the embodiment shown on the drawing, only the lower head 1 is positively driven. I wish it however to be understood that instead of that the upper head 12 or both heads may be positively driven, or they may be also both mounted loosely on their shafts. In any case the heads can be readily adapted to different speeds of the rolled stock, and no slipping or pinching will occur.

I claim as my invention:

1. In combination with a conveyor of a rolling mill stand and carriers disposed on either side of and movable across said conveyor and having straightening faces, independent supports pivotally mounted on one of said carriers, movable means arranged in each of said supports and adapted for turning rolled stock on said conveyor one of said movable means when moved to operative position lifting the stock off the conveyor, and means for advancing said turning means into operative position above said conveyor and withdrawing them therefrom.

2. In combination with a conveyor of a rolling mill stand and carriers disposed on either side of and movable across said conveyor and having straightening faces, independent supports pivotally mounted on one of said carriers, a movable ram arranged in each of said supports and each having a grooved head adapted for turning rolled stock on said conveyor one of said movable rams when moved to operative position lifting the stock off the conveyor, and means for advancing said rams into operative position above said conveyor and withdrawing them therefrom.

3. In combination with a conveyor of a rolling mill stand and carriers disposed on either side of and movable across said conveyor and having straightening faces, independent supports pivotally mounted on one of said carriers, a movable ram arranged in each of said supports and having a grooved head adapted for turning rolled stock on said conveyor one of said movable rams when moved to operative position lifting the stock off the conveyor, means for positively rotating one of said heads, and means for advancing said rams into operative position above said conveyor and withdrawing them therefrom.

4. In combination with a conveyor of a rolling mill stand and carriers disposed on either side of and movable across said conveyor and having straightening faces, independent supports pivotally mounted on one of said carriers, a movable ram arranged in each of said supports and having a grooved head adapted for turning rolled stock on said conveyor one of said movable rams when moved to operative position lifting the stock off the conveyor, means for positively rotating one of said heads, and means for moving each support to thereby advance the rams into operative position above said conveyor, and withdrawing them therefrom.

5. In combination with a conveyor of a rolling mill stand and carriers disposed on either side of and movable across said conveyor and having straightening faces, supports pivotally mounted on one of said carriers, a movable ram arranged in each of said supports and having a grooved head adapted for turning rolled stock on said conveyor, means for positively rotating one of said heads, means for moving each support to thereby advance the rams into operative position above said conveyor, and withdrawing them therefrom, and a means associated with the upper one of said supports so as to exert a downward pressure on the grooved head of the corresponding ram.

JOSEF GASSEN.